(12) United States Patent
Caswell

(10) Patent No.: US 12,464,609 B1
(45) Date of Patent: Nov. 4, 2025

(54) MICROWAVE OVEN SPLATTER COVER OR ENCLOSURE

(71) Applicant: Caswell Products LLC, Zimmerman, MN (US)

(72) Inventor: Ty Caswell, Zimmerman, MN (US)

(73) Assignee: Caswell Products LLC, Zimmerman, MN (US)

( * ) Notice: Subject to any disclaimer, the term of this patent is extended or adjusted under 35 U.S.C. 154(b) by 0 days.

(21) Appl. No.: 18/958,859

(22) Filed: Nov. 25, 2024

(51) Int. Cl.
*H05B 6/64* (2006.01)
*H05B 6/80* (2006.01)

(52) U.S. Cl.
CPC .................................. *H05B 6/6408* (2013.01)

(58) Field of Classification Search
CPC ........ Y10S 99/14; A47G 19/26; A47J 36/027; A47J 36/06; F24C 15/16; F24C 15/162; H05B 6/64; H05B 6/6408; H05B 6/6447
USPC ............... 219/725, 734, 731, 732, 729, 762; 220/252, 367.1, 369, 573.1, 574; 99/451; 426/241
See application file for complete search history.

(56) References Cited

U.S. PATENT DOCUMENTS

| | | | | | |
|---|---|---|---|---|---|
| 2,731,663 | A | * | 1/1956 | Thompson | A47J 45/10 220/759 |
| 2009/0294217 | A1 | * | 12/2009 | Tanaka | B65B 25/001 186/49 |
| 2017/0354292 | A1 | * | 12/2017 | Caswell | A47J 36/04 |

\* cited by examiner

*Primary Examiner* — Quang T Van
(74) *Attorney, Agent, or Firm* — Patterson Thuente P.A.

(57) ABSTRACT

Various reusable microwave oven covers or enclosures configured to inhibit food and liquid splattering during microwave oven cooking or heating. A microwave oven cover assembly may include a housing configured for covering a food item during microwave oven cooking, the housing having a closed end and an open end. The cover assembly may further include a rim coupled to the housing at the open end, the rim having a first rim portion couplable to a second rim portion at a corner to provide structural strength to the rim. The rim can be configured for gripping by a user to move the cover assembly on to or off a food item during microwave oven cooking. Optionally, the cover assembly can include a magnet assembly or a non-magnetic handle assembly for moving or storing the cover assembly.

15 Claims, 16 Drawing Sheets

MICROWAVE OVEN SPLATTER COVER OR ENCLOSURE

TECHNICAL FIELD

The present disclosure generally relates to reusable microwave oven covers or enclosures configured to inhibit food and liquid splattering during cooking or heating. More particularly, the present disclosure relates to microwave oven splatter covers or enclosures having, among other features, an outer rim for gripping by a user and a magnet assembly that enables storage inside a microwave oven.

BACKGROUND

Currently, there are several solutions for keeping a microwave oven clean when cooking items that may splatter. One of these solutions attempts to place a paper towel or cloth over the plate or bowl of food being cooked. This approach fails to meet the needs of the market because the paper towel gets into the food making the cooking experience messy or the paper towel falls off especially when using a microwave oven that has a rotating carrousel. Another solution is to use a plastic plate cover or splatter guard assembly, but this solution is similarly unable to meet the needs of the market because the plate cover can become extremely hot to the touch, and the splatter guard assembly makes food soggy due to steam build-up inside the microwave cover. Further, the plastic plate cover or splatter guard assembly is large and takes up excessive space in the kitchen cabinet when not in use.

Another solution to keeping a microwave oven clean when cooking or heating items that may splatter is U.S. Pat. No. 10,582,802 to the present assignee, Caswell Products LLC (hereafter "the '802 patent"), the disclosure of which is hereby incorporated by reference in its entirety. The '802 patent describes, among other things, a reusable microwave splatter cover member with improved ventilation that is storable in the microwave oven on an interior surface via one or more microwave-safe magnets. Examples described in the '802 patent offer several advantages over conventional microwave oven covers or enclosures, including: inhibiting splattering during the cooking or heating process; providing vents and space at or near a base of the cover to enable decreased water vapor and droplet accumulation inside the cover from steam generated during microwaving; providing a cover that remains cool to the touch when removed from the microwave oven after cooking or heating; and providing a cover that can be stored on one or more of the interior surfaces of the microwave when not in use so as not to take up space in a drawer or cabinet.

Another solution is U.S. Patent Publication No. 2023/0145139 to Two Pillars LLC (hereafter "the '139 publication"), the disclosure of which is hereby incorporated by reference in its entirety. The '139 publication describes a microwave oven cooking device for cooking food using steam inside a microwave oven. Notably, the device includes a plurality of magnets arranged in a circular pattern and embedded in an interior part of a top portion of the device, as depicted in FIG. 6 of the '139 publication. The plurality of magnets are used to attach the device to a top interior wall of a microwave oven. The device also includes a lip feature on a bottom portion of the device. The lip feature appears to rest on a microwave oven tray during cooking or heating using the device. The '139 publication does not disclose leg posts or similar structures attached to the lip feature, nor any openings in the bottom portion for facilitating air flow through the device.

Another solution is "Prep Solutions by Progressive Collapsible Microwave Food Cover" from Progressive International, sold under universal product code 078915059833 (hereafter "Prep Solutions Cover"), the disclosure of which is hereby incorporated by reference in its entirety. The Prep Solutions Cover is described as a collapsible microwave oven cover having steam vents on the side to inhibit overheating during microwave oven use. The Prep Solutions Cover includes a cool touch handle designed as a vertical wall attached to a bottom portion of the cover. Notably, the cool touch handle does not include any structural support attached to the vertical wall which limits the gripping potential of the handle by a user. Like the '139 publication, the Prep Solutions Cover also does not disclose any leg posts or similar structures which create openings in the bottom portion for facilitating air flow through the device during microwaving.

Based on these solutions, there is a need for improvements or enhancements to existing microwave oven covers or enclosures. The present disclosure provides several improvements that advantageously fill the limitations of existing solutions. Additional advantages of the present disclosure over existing microwave oven cover or enclosure solutions will become apparent based on the written description and accompany figures provided herein.

SUMMARY

Examples of the present disclosure relate to a reusable microwave oven cover or enclosure configured to inhibit splattering of food or liquids during microwave oven cooking or heating. Examples of the present disclosure can be stored inside a microwave oven using a microwave-safe magnet assembly when not in use. Examples of the present disclosure can be easily gripped by a user along an integrated rim couplable to a housing of the microwave oven cover or enclosure. The present disclosure provides several advantages over conventional microwave oven covers or enclosures, including: providing designs that reduce the space occupied by a cover when stored in a microwave; providing designs that incorporate an ergonomic and structurally supported rim portion for easy cover gripping and movement by a user; providing several non-magnetic solutions for storing and moving a cover both inside and outside a microwave oven; and providing cover features that can be included with conventional microwave oven covers or enclosures to improve their usability. Other advantages of the microwave oven covers or enclosures described herein will become apparent upon review of the written description and accompanying figures.

In a particular example of the present disclosure, a cover assembly for use in a microwave oven may include a housing configured for covering a food item during microwave oven cooking, the housing having a closed end and an open end. The cover assembly may further include a rim couplable to the housing at the open end, the rim having a first rim portion couplable to a second rim portion at a corner (e.g., the corner optionally presenting an approximate 90-degree angle) to provide structural strength to the rim. The rim can be configured for gripping by a user to move the cover assembly on to or off a food item during microwave oven cooking.

In other examples, the rim may further include a third rim portion couplable to the second rim portion at a corner, where the first, second, and third rim portions collectively form a ripple design when the rim is viewed at a cross-section. In other examples, the rim can include an inner wall opposite an outer wall, the inner wall configured to receive a finger of a user for gripping by the user. In other examples, the closed end of the housing can have at least one opening adapted to enable airflow through the closed end. In other examples, the cover assembly may include at least two leg posts, the at least two leg posts configured to support the housing on a flat surface and configured to facilitate air flow through the housing. In other examples, the cover assembly may include a handle assembly couplable to the closed end, the handle assembly having a handle member configured for gripping by a user, thereby enabling movement of the cover assembly. In other examples, the handle member can define at least one cavity that a user can grasp to enable movement of the cover assembly.

In other examples, the housing may taper from the open end to the closed end. In other examples, the housing can define one or more ridges positioned on a peripheral housing surface. In other examples, the first rim portion can be couplable to the second rim portion at a rounded corner defining an approximate 90-degree angle between the first and second rim portions. In other examples, the cover assembly may further include a metallic member couplable to the housing, the metallic member configured to magnetically interface with a microwave oven magnet to adhere the cover assembly to the microwave oven.

In a particular example of the present disclosure, a cover assembly for use in a microwave oven may include a housing configured for covering a food item during microwave oven cooking, the housing having a closed end and an open end. The closed end of the housing can have at least one opening adapted to enable airflow through the closed end. The cover assembly may further include a rim couplable to the housing at the open end, the rim having a first rim portion couplable to a second rim portion at a corner (e.g., the corner optionally presenting an approximate 90-degree angle) to provide structural strength to the rim. The rim may further include a third rim portion couplable to the second rim portion at a corner (e.g., the corner optionally presenting an approximate 90-degree angle), where the first, second, and third rim portions can collectively form a ripple design when the rim is viewed at a cross-section. The rim can be configured for gripping by a user to move the cover assembly onto or off a food item during microwave oven cooking. The cover assembly may further include at least two leg posts extending from the rim, the at least two leg posts configured to support the housing on a flat surface and configured to facilitate air flow through the housing.

In a particular example of the present disclosure, a cover assembly for use in a microwave oven may include a housing configured for covering a food item during microwave oven cooking, the housing having a closed end and an open end. The cover assembly may further include a magnet assembly integrated into the closed end of the housing, the magnet assembly configured to adhere the housing to an interior surface of the microwave oven at a single location. The magnet assembly may include a magnet and a metallic piece, the metallic piece positioned adjacent a bottom end of the magnet located proximal the closed end. The metallic piece can be configured to be saturated with magnetic field during use of the cover assembly in a microwave oven, thereby causing an increase in magnetism at a top end of the magnet for improved magnetic pull strength and for inhibiting magnetic leakage elsewhere out of the magnet assembly.

In other examples, the magnet assembly may include an overmold that contains the magnet and the metallic piece. In other examples, the magnet assembly can be positioned approximately at a midpoint of the closed end of the housing. In other examples, the magnet and the metallic piece can be covered with one or both of a metal foil and a metallic coating to shield the magnet assembly during microwave oven cooking. In examples, the magnet and the metallic piece can have independent, separate coverings of one or both of a metal foil and a metallic coating. In other examples, the magnet assembly may further include an overmold that encloses the magnet and the metallic piece at the closed end of the housing, and an undermold that encloses the magnet and the metallic piece at the open end of the housing. The overmold and the undermold may collectively enclose the magnet and the metallic piece within the housing, thereby protecting the magnet and the metallic piece during microwaving. In other examples, the cover assembly can be configured for use with both magnetic and non-magnetic microwave ovens.

In other examples, the cover assembly may include a rim couplable to the housing at the open end, the rim having a first rim portion couplable to a second rim portion at a corner (e.g., the corner optionally presenting an approximate 90-degree angle) to provide structural strength to the rim. The rim can be configured to be gripped by a user to move the cover assembly on to or off a food item during microwave oven cooking. In other examples, the rim may further include a third rim portion couplable to the second rim portion at a corner (e.g., the corner optionally presenting an approximately 90-degree angle), where the first, second, and third rim portions can collectively form a ripple design when the rim is viewed at a cross-section.

In other examples, the closed end of the housing can have at least one opening adapted to enable airflow through the closed end. In other examples, the cover assembly may include at least two leg posts, the at least two leg posts configured to support the housing on a flat surface and configured to facilitate air flow through the housing. In other examples, the first rim portion and the second rim portion, when included with a cover assembly, may collectively comprise a substantially convex, inward arcing configuration. In other examples, the first rim portion and the second rim portion, when included with a cover assembly, may collectively comprise a substantially concave, outward arcing configuration.

In examples, a cover assembly for use in a microwave oven may include a housing configured for covering a food item during microwave oven cooking, the housing having a closed end and an open end, and a metallic member coupled to the housing at the closed end. In other examples, the cover assembly may further include a magnet assembly integrated into the closed end of the housing, the magnet assembly configured to adhere the housing to an interior surface of the microwave oven at a single location, the magnet assembly comprising a magnet positioned proximal the metallic member, wherein the metallic member can be configured to be saturated with magnetic field during use of the cover assembly in a microwave oven, thereby causing an increase in magnetism at a top end of the magnet for improved magnetic pull strength and for inhibiting magnetic leakage elsewhere out of the magnet assembly. In other examples, the metallic member can be configured to magnetically interface with a microwave oven magnet to adhere the cover assembly to the microwave oven.

The summary above is not intended to describe each illustrated example or every implementation of the present disclosure. The figures and the detailed description that follow more particularly exemplify these examples.

BRIEF DESCRIPTION OF THE DRAWINGS

Subject matter hereof may be more completely understood in consideration of the following detailed description of various examples in connection with the accompanying figures, in which.

Figure 1A:
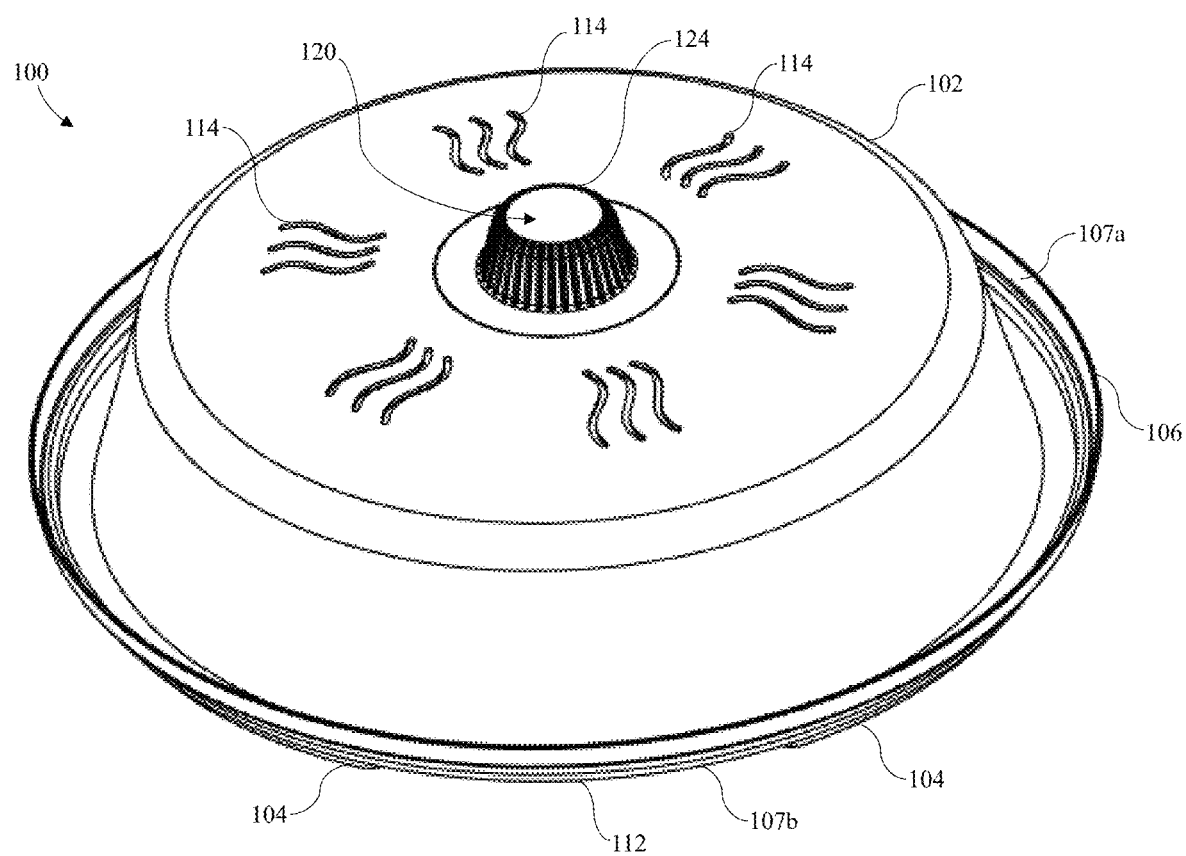
FIGS. 1A-1C are perspective views of a first microwave oven cover assembly, according to examples of the present disclosure.
Figure 1B:
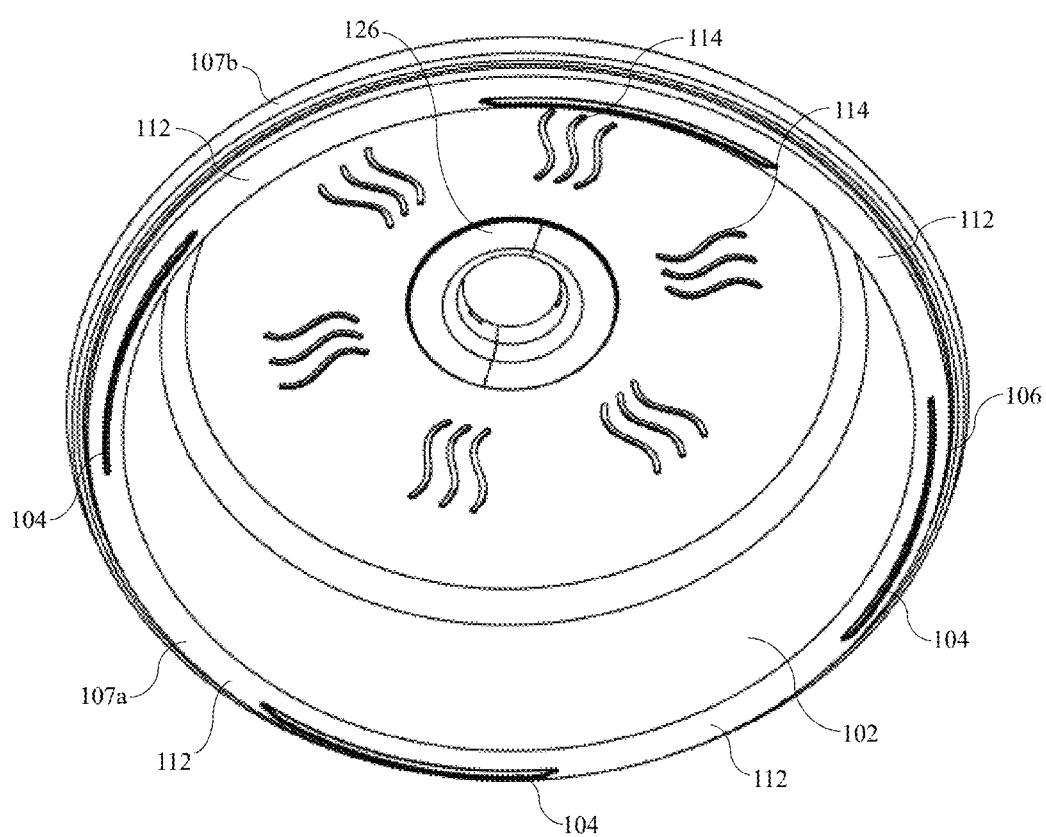
Figure 1C:
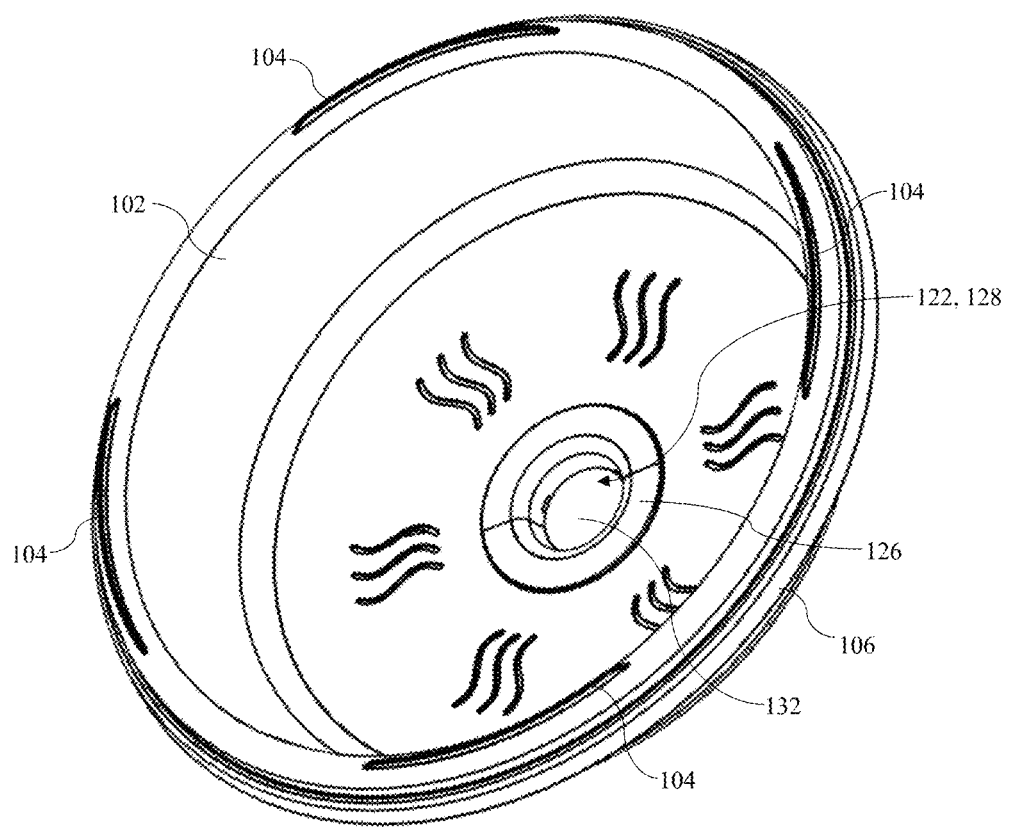
Figure 1D:
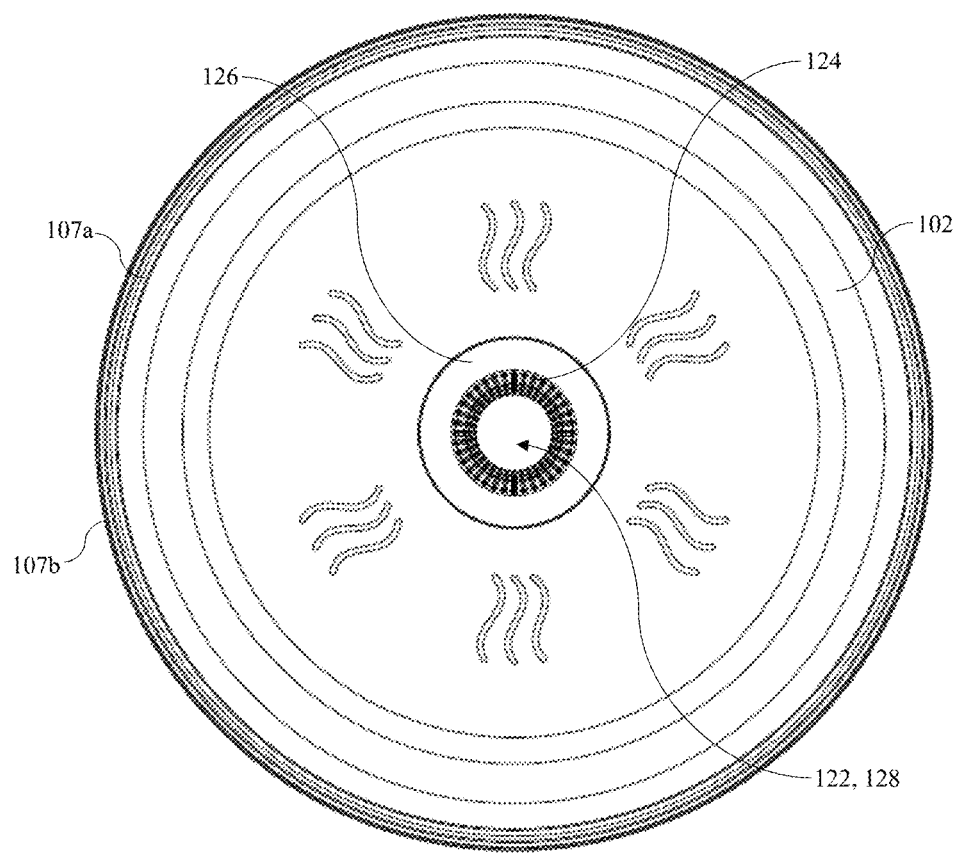
FIGS. 1D and 1E are top and bottom views, respectively, of a first microwave oven cover assembly, according to examples of the present disclosure.
Figure 1E:
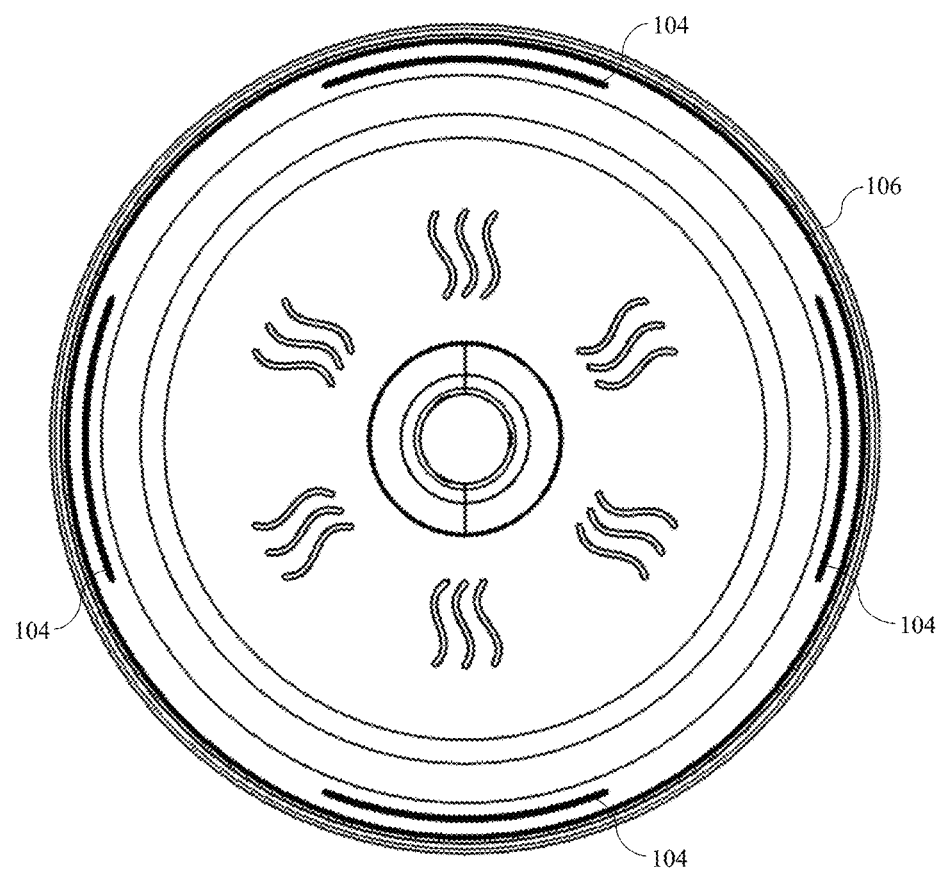
Figure 1F:
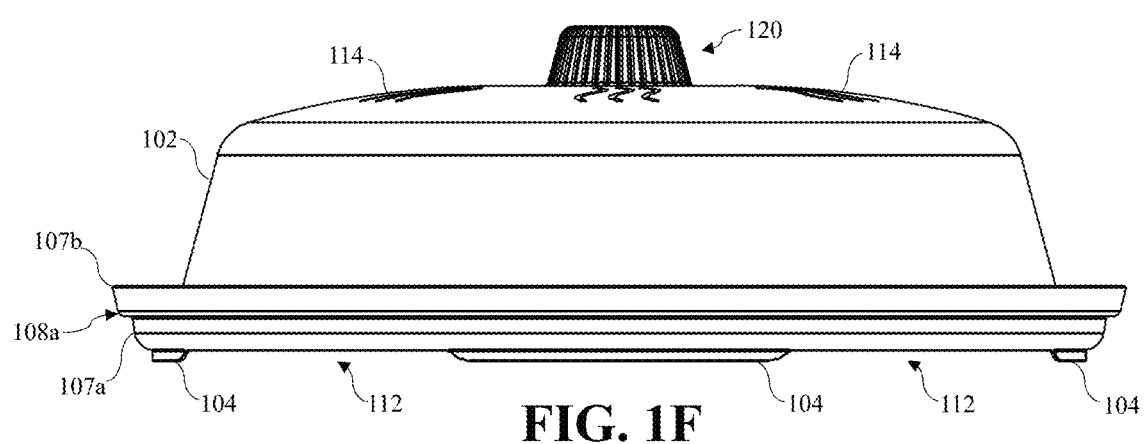
FIG. 1F is a side view of a first microwave oven cover assembly, according to examples of the present disclosure.
Figure 1G:
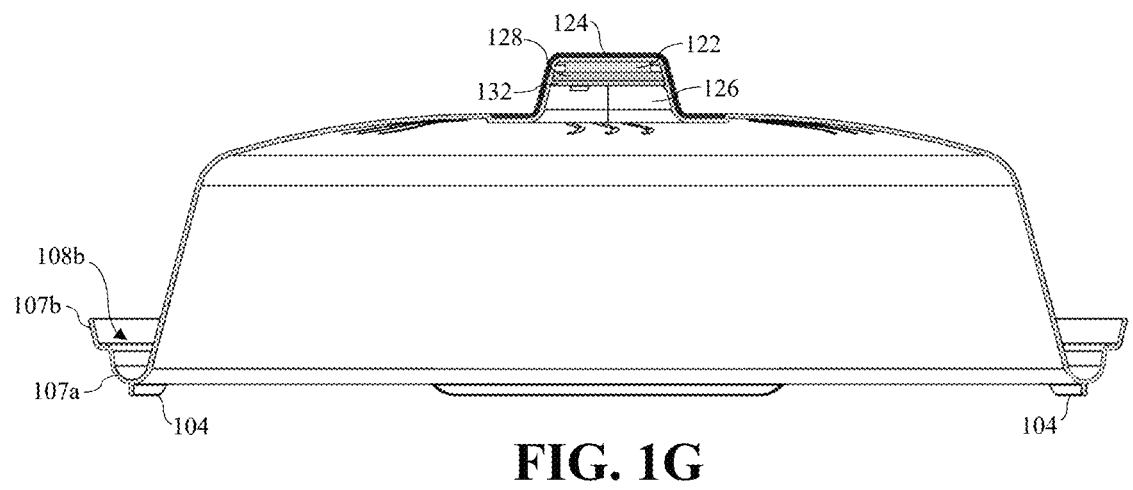
FIG. 1G is a cross-section side view of a first microwave oven cover assembly, according to examples of the present disclosure.
Figure 1H:
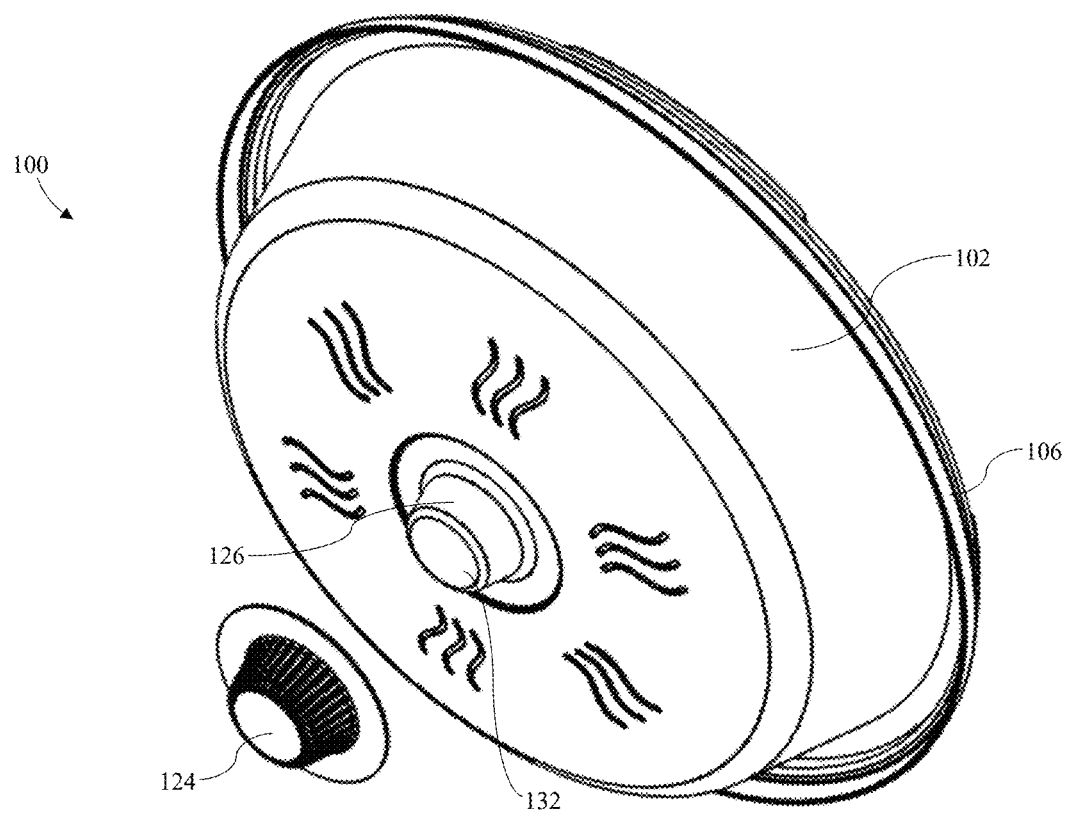
FIG. 1H is an exploded view of a first microwave oven cover assembly, according to examples of the present disclosure.
Figure 2A:
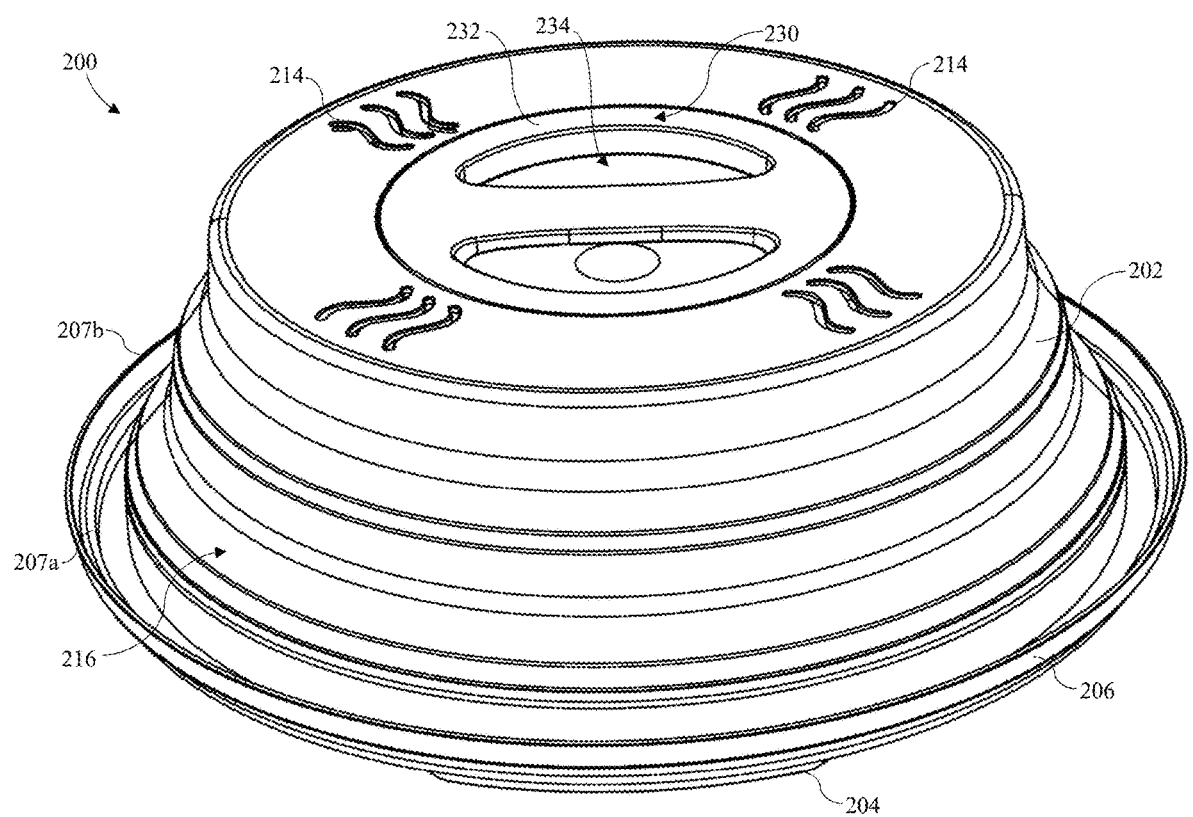
FIGS. 2A-2C are perspective views of a second microwave oven cover assembly, according to examples of the present disclosure.
Figure 2B:
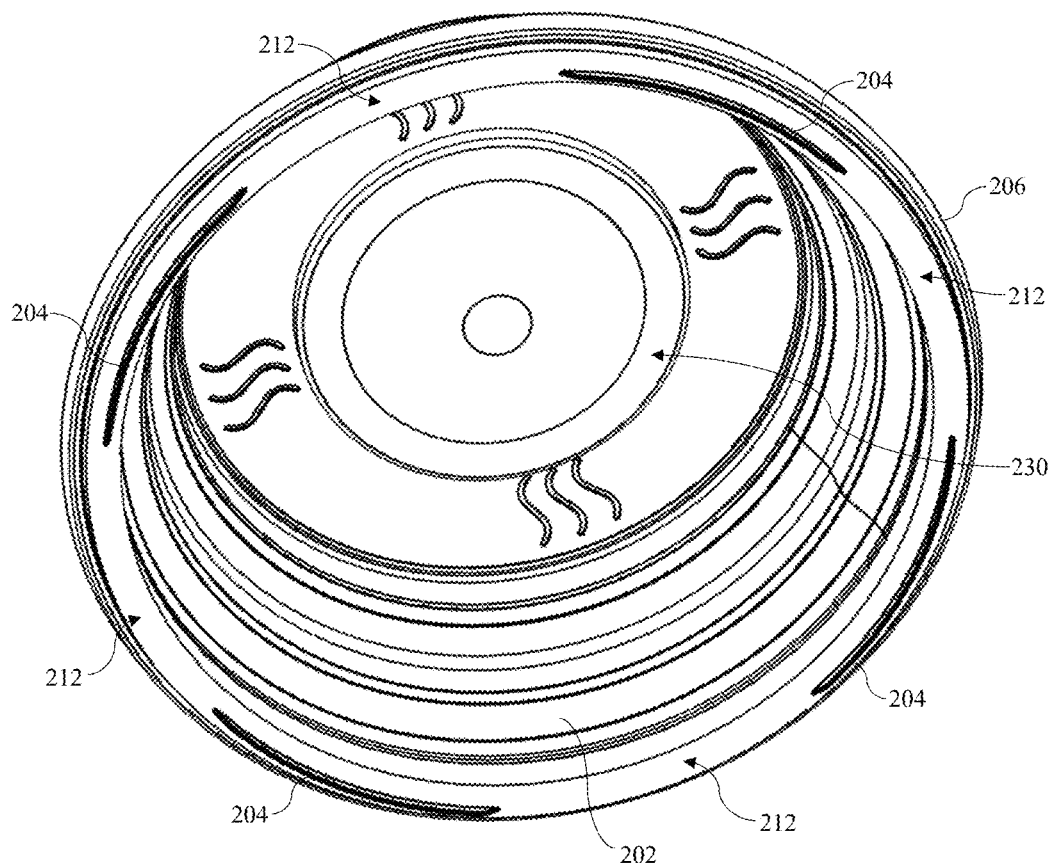
Figure 2C:
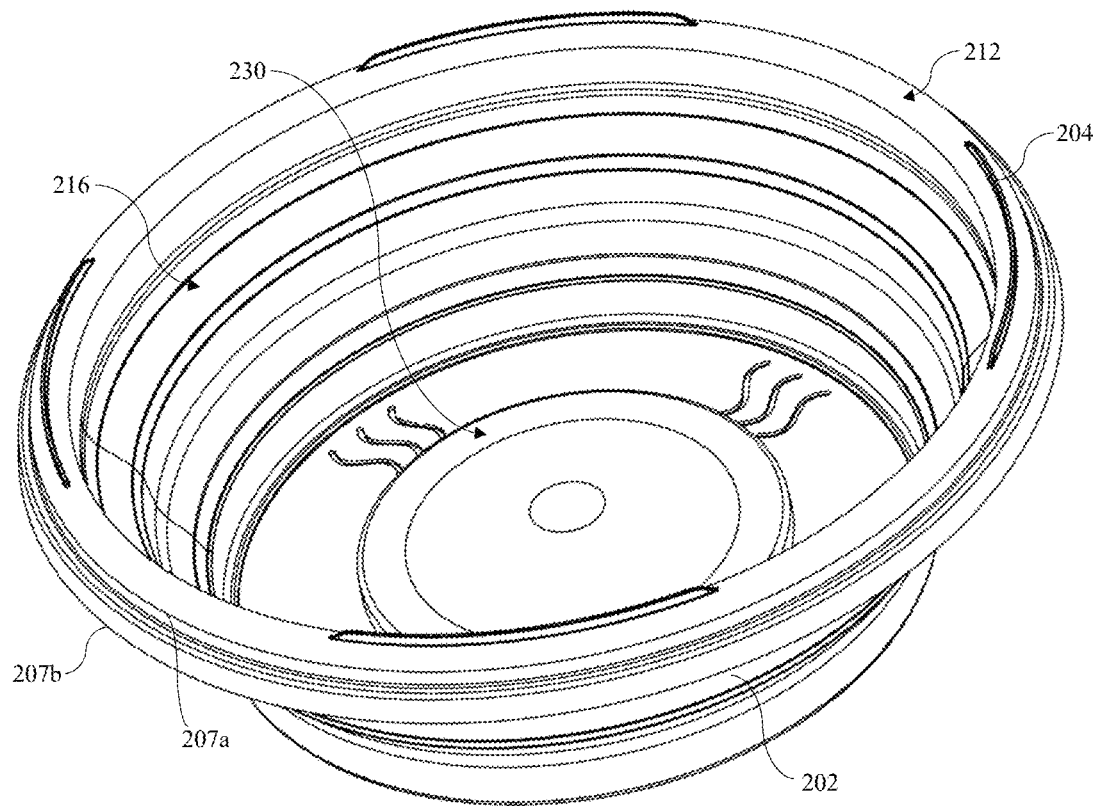
Figure 2D:
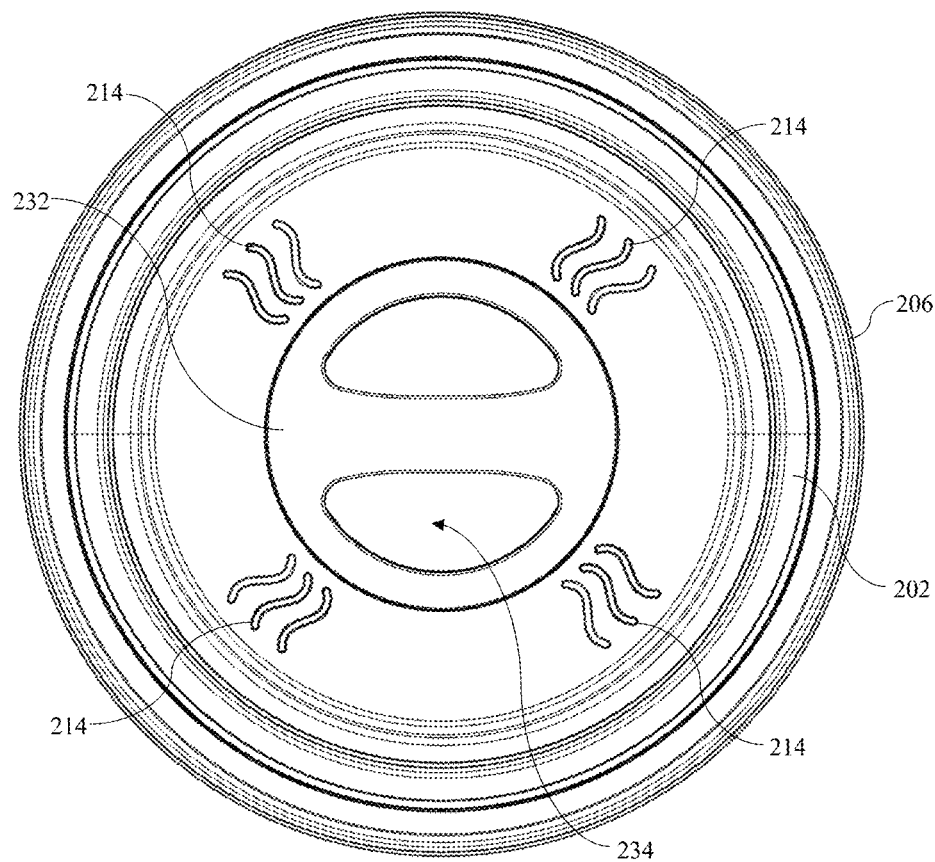
FIGS. 2D and 2E are top and bottom views, respectively, of a second microwave oven cover assembly, according to examples of the present disclosure.
Figure 2E:
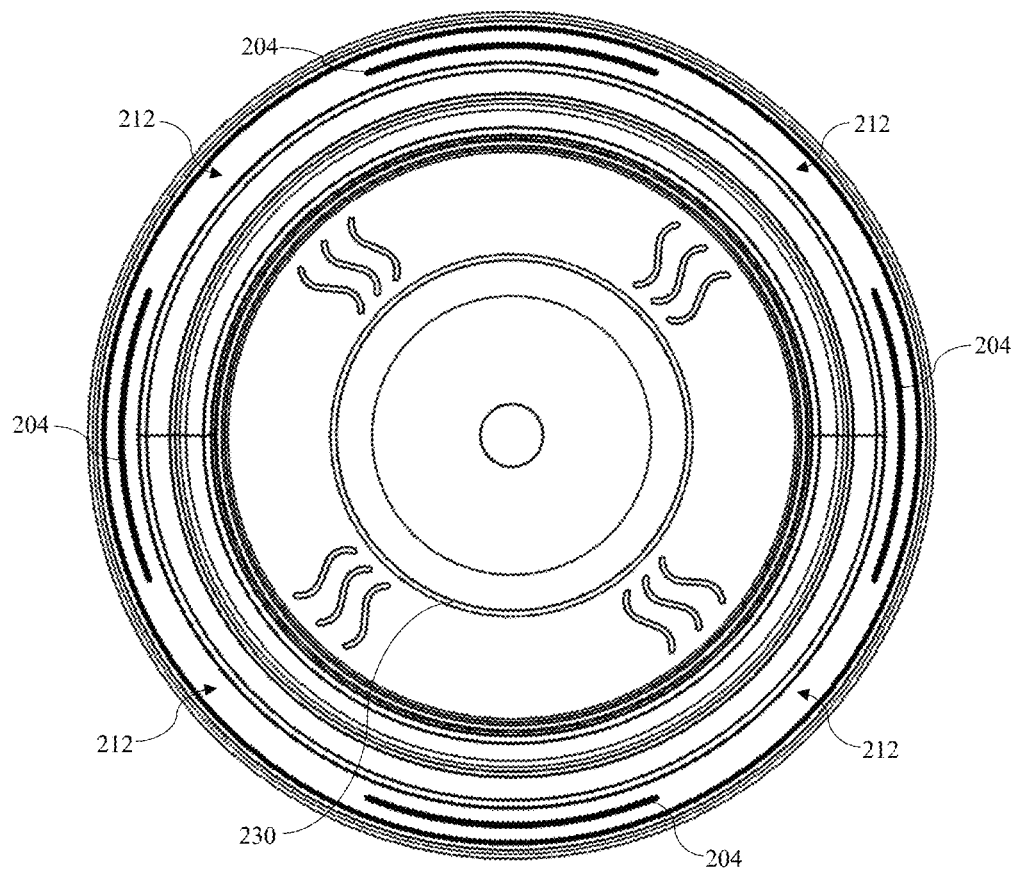
Figure 2F:
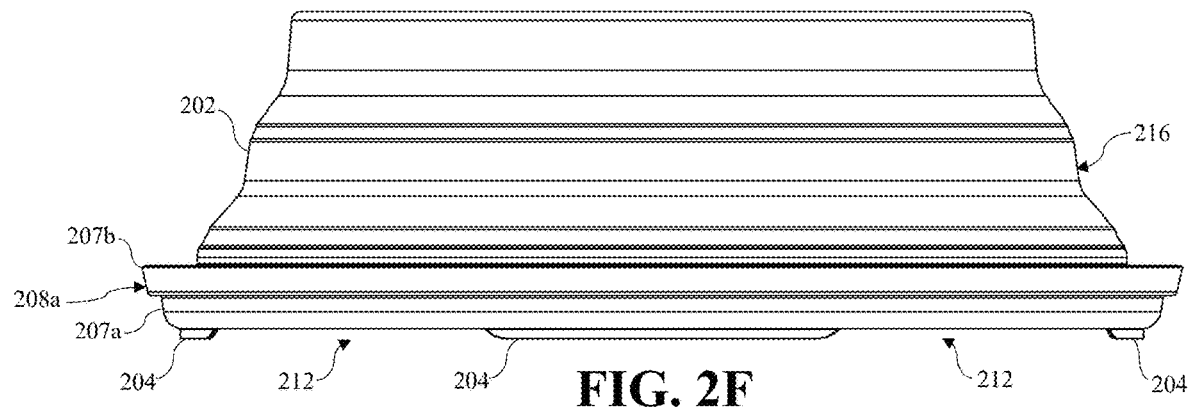
FIG. 2F is a side view of a second microwave oven cover assembly, according to examples of the present disclosure.
Figure 2G:
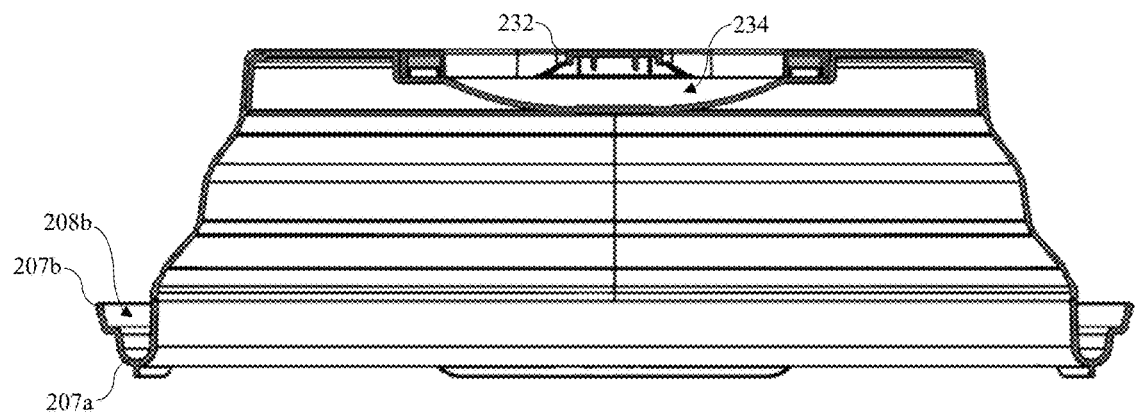
FIG. 2G is a cross-section side view of a second microwave oven cover assembly, according to examples of the present disclosure.
Figure 2H:
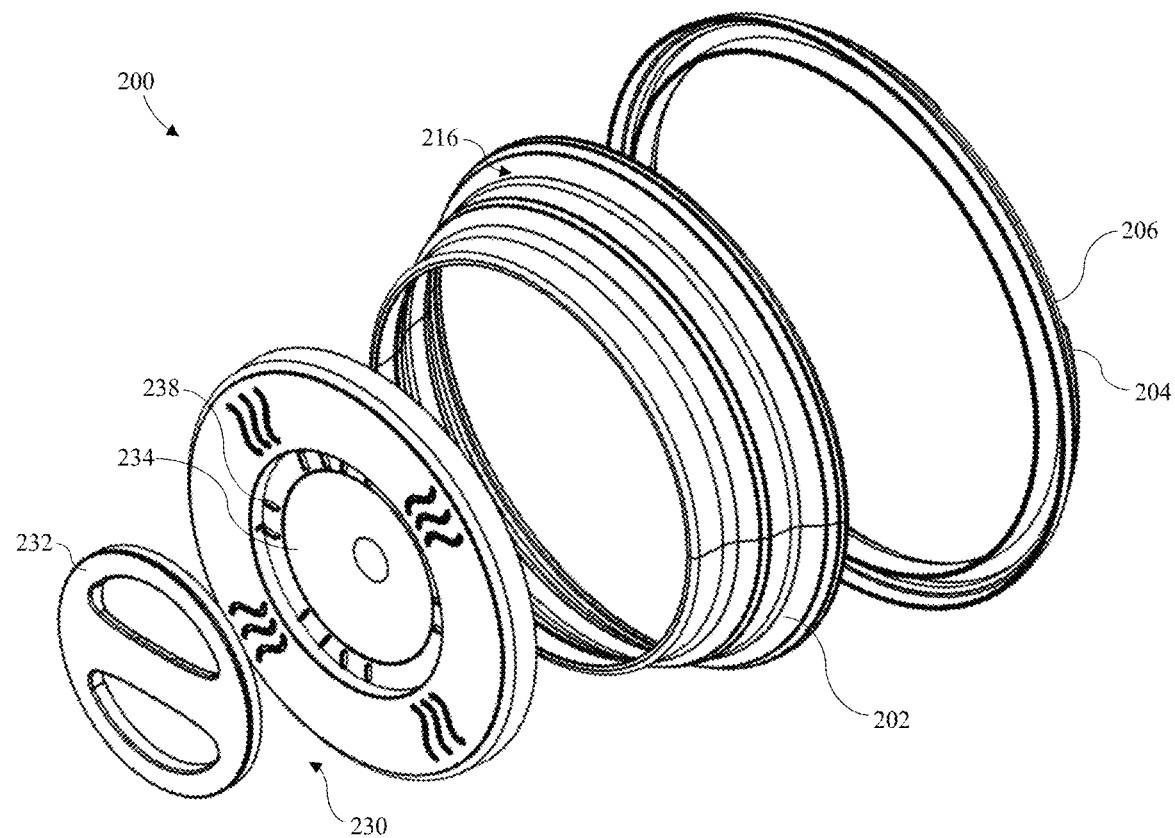
FIG. 2H is an exploded view of a second microwave oven cover assembly, according to examples of the present disclosure.

While various examples are amenable to various modifications and alternative forms, specifics thereof have been shown by way of example in the drawings and will be described in detail. It should be understood, however, that the intention is not to limit the claimed disclosure to the particular examples described. On the contrary, the intention is to cover all modifications, equivalents, and alternatives falling within the spirit and scope of the subject matter of the present disclosure.

DETAILED DESCRIPTION OF THE DRAWINGS

Before turning to the figures, which illustrate certain examples in detail, it should be understood that the present disclosure is not limited to the details or methodology set forth in the description or illustrated in the figures. It should also be understood that the terminology used herein is for the purpose of description only and should not be regarded as limiting. Common definitions are generally intended for the terminology used herein unless a specific definition is provided. In the case of a term having a common definition and a specific definition provided herein, the term should be construed according to its specific definition.

Referring generally to FIGS. 1A through 1H, a cover assembly 100 for use with a microwave oven during cooking or heating, according to a first design of the present disclosure, is shown. Cover assembly 100 is generally used to inhibit splattering of food, liquid, or other items during microwave cooking or heating. Although not explicitly depicted in the figures, cover assembly 100 can be disposed within an interior space of a microwave oven having an optional rotatable carousel, with cover assembly 100 being placed over a microwaveable container or plate positioned on the optional rotatable carousel (or bottom surface of the microwave oven interior space if there is no rotatable carousel). When not in use, cover assembly 100 may be stored on a microwave oven ceiling, defined within the interior space of the microwave oven, using magnet assembly 120. Advantageously, magnet assembly 120 is generally positioned at, or approximately at, a midpoint of a top surface of cover assembly 100. This enables cover assembly 100 to be magnetically couplable to a single point on the microwave oven ceiling which reduces the footprint (i.e., occupied space) of cover assembly 100 when stored in the microwave oven. Because magnet assembly 120 is provided at or approximately at a midpoint of cover assembly 100, the weight distribution around magnet assembly 120 is equal or approximately equal in magnitude.

Additionally, as discussed in further detail below, positioned around a periphery of cover assembly 100 is rim 106 which can be gripped by a user to move the cover assembly 100 onto or off a food, liquid, or other item during microwave oven cooking or heating. For example, a user can press their thumb or other finger against an inner wall 108$b$ defined by rim 106 to move cover assembly 100 as needed. Inner wall 108$b$ is generally positioned opposite outer wall 108$a$ as illustrated in the figures. The curved, structurally strong design of rim 106 provides ample ergonomic support for the user when moving cover assembly 100 into, out of, or within a microwave oven. Other advantageous features and benefits of cover assembly 100 will become apparent throughout this disclosure.

Cover assembly 100 may include a housing 102, at least two leg posts 104 positioned below the housing 102, a rim 106 positioned between the housing 102 and the at least two leg posts 104, one or more first ventilation openings 112 positioned between adjacent at least two leg posts 104, one or more second ventilation openings 114 defined in a top surface of housing 102, and a magnet assembly 120 integrated into the housing 102. Magnet assembly 120 may include a "KEEPER" magnet 122 (used interchangeably herein with "magnet 122"), an overmold 124 that envelops or covers magnet 122 from the closed end of housing 102, a undermold 126 couplable to an opening in the top surface of housing 102 and configured to securely hold magnet 122 in place, a metallic piece 128 (e.g., a metallic washer or slug) positioned underneath magnet 122, and a door 129 that covers magnet 122 from the open end of housing 102. Generally, magnet 122 and metallic piece 128 will be covered or coated with one or both of a metal foil (e.g., aluminum foil) and a metallic coating (e.g., a metallic powder coating) to shield the magnet assembly 120 from microwave energy during use of cover assembly 100 in a microwave oven.

In examples, the metallic coating can comprise zinc, nickel, copper, gold. In examples, the metallic coating can comprise non-metals such as epoxy, polymers (e.g., ABS, PTFE, fluoropolymers), and adhesives. In specific examples, the metallic coating can comprise a standalone (one layer) zinc coating, a combined nickel-copper-nickel coating, a combined nickel-copper-nickel-gold coating, or a combined nickel-copper-epoxy coating. Other suitable metal and non-metal coating combinations are also contemplated by the present disclosure. In examples, the metallic coating can have a thickness ranging from approximately 0.000254 centimeters (0.0001 inches) to approximately 0.00127 centimeters (0.0005 inches).

Housing 102 is generally dome-shaped in that it defines a tapered profile between a top, closed portion and a bottom, open portion. Specifically, housing 102 can define a substantially frustoconical geometry with an edge of the top, closed portion being rounded by a fillet or cut as a chamfer, for example, as illustrated particularly in FIGS. 1F and 1G. The top, closed portion can be defined as a closed end of housing 102 while the bottom, open portion can be defined as an open end of housing 102. Housing 102 generally defines an open cavity between the closed and open ends as illustrated particularly in FIG. 1B. The open cavity can receive the food, liquid, or other item therein when cover assembly 100 is used for microwave cooking or heating. The open cavity generally defines a circular cross-section though other cross-sections such as rectangular, triangular, or pentagonal, for example, are contemplated by the present disclosure. The open cavity defines a height and diameter (or width) sufficient to receive common food, liquid, or other common microwavable items (e.g., food and beverage containers).

The at least two leg posts 104 generally protrude outward from either housing 102 or rim 106, away from the open end of housing 102 as illustrated in the figures. The at least two leg posts 104 are generally placed equidistant around the circular cross-section surface formed with the open end of housing 102. Non-equidistant arrangements are also contemplated by the present disclosure (e.g., three leg posts 104 separated by varying distances around the circular cross-section surface). Each leg post 104 may have a length in the range of approximately 0.635 to 15 centimeters (approximately 0.25 to 6 inches), though other lengths less than or greater than this range are contemplated. Each leg post 104 may have a thickness or height equal to or approximately 0.3302 centimeters (approximately 0.130 inches). Each leg post 104 may comprise a pair of rounded ends couplable (e.g., operably couplable) by a linear portion as illustrated particularly in FIG. 1F. The at least two leg posts 104 are configured to prop open the open end of housing 102 to provide ventilation during microwave oven operation. Specifically, each pair of at least two leg posts 104 defines a first ventilation opening 112 on the open end of housing 102. First ventilation opening 112 enables air flow through the bottom portion of housing 102, up to the top portion, and out of one or more second ventilation openings 114 defined in a top surface of housing 102. This provides ventilation for cover assembly 100 and eliminates or reduces condensation build-up from steam generated during microwaving.

Rim 106 is generally integrally couplable to housing 102 such that the two features form a single unitary component of cover assembly 100. This can be achieved using a molding process during manufacturing of cover assembly 100. In examples, housing 102 and rim 106 can be manufactured using injection molding, extrusion, or additive manufacturing, for example. In other examples of the present disclosure, rim 106 can be couplable to housing 102 using welding, adhesives, fasteners, hook and look straps, or another suitable coupling process. Rim 106 can be formed around the periphery of housing 102 in a circular configuration (i.e., rim 106 surrounds the entire periphery of housing 102). As depicted, rim 106 generally has an inner diameter greater than the outer diameter of housing 102 which enables rim 106 to be gripped by a user in the space separating rim 106 and housing 102. As contemplated by the present disclosure, rim 106 may comprise non-circular geometrical configurations such as rectangular, triangular, or an irregular polygonal geometry. For example, rim 106 may have a square geometry while housing 102 maintains its substantially frustoconical geometry.

Rim 106 is generally a thin-walled structure defining a first rim portion 107a couplable (e.g., operably couplable) to a second rim portion 107b. In examples, rim 106 may have a thickness equal to or approximately 0.127 centimeters (approximately 0.050 inches). As illustrated in the figures, first rim portion 107a can be proximal housing 102 whereas second rim portion 107b is distal from housing 102 (proximal and distal being relative terms used to describe the first rim portion 107a generally being positioned closer to housing 102 when compared to second rim portion 107b). In combination, first and second rim portions 107a,b may have a curved or wavy cross-section as shown particularly in FIG. 1G. Specifically, first rim portion 107a may have a substantially U-shaped cross-section that extends 360-degrees around the periphery of housing 102. First rim portion 107a and housing 102 may define a radial dimension equal to or approximately 0.47752 centimeters (approximately 0.188 inches) to form the substantially U-shaped cross-section. Second rim portion 107b may have a substantially curved L-shaped configuration that couples (e.g., operably couples) to first rim portion 107a to form the curved or wavy cross-section of rim 106 shown in FIG. 1G. In other examples, first and second rim portions 107a,b may collectively comprise a substantially convex, inward arcing configuration (e.g., similar to rim 406 illustrated in FIG. 4). In other examples, first and second rim portions 107a,b may collectively comprise a substantially concave, outward arcing configuration (e.g., similar to rim 506 in FIG. 5).

Rim 106 can be structurally supported by the coupling of first and second rim portions 107a,b at a corner which can be optionally rounded. In examples, the corner between first and second rim portions 107a,b can form an approximate 90-degree angle at the shared, optionally rounded corner. The corner transition between first and second rim portions 107a,b, which is generally placed along or near a vertical midpoint of rim 106, is advantageous because it inhibits or reduces mechanical deformation of rim 106. Specifically, the corner transition inhibits or reduces bowing and bending of rim 106 when picked up and held by a user (e.g., when picked up and held by a user's thumb or other fingers). In examples, first rim portion 107a may extend or protrude outward at an angle equal to or approximately 23 degrees. In examples, second rim portion 107b may extend or protrude outward at an angle equal to or approximately 5 degrees.

In other examples, rim 106 can include additional rim portions beyond first and second rim portions 107a,b (e.g., third, fourth, fifth, sixth, etc., rim portions). Rim 106 with additional rim portions may define a cross-section geometry or profile having a wave, ripple, or curved profile which also advantageously inhibits or reduces mechanical deformation to rim 106 (more discussion on this alternative rim 106 configuration is included below in reference to rim 306 illustrated in FIG. 3). In other examples, rim 106 may comprise a substantially convex, inward arcing configuration or a substantially concave, outward arcing configuration, both of which are discussed further in reference to FIGS. 4 and 5 below.

In examples, rim 106 may have an overall height defined between bottom and top surfaces in the range of approximately 1.27 centimeters (½ inch) to approximately 12.7 centimeters (five inches). The heights of first and second rim portions 107a,b may be approximately equal or may be different (e.g., first rim portion 107a can have a height of approximately 1.27 centimeters (½ inch) and second rim portion 107b can have a height of approximately 0.9525 centimeters (approximately ⅜ inch)). In examples, second rim portion 107b may be laterally offset from first rim portion 107a by a distance in the range of approximately 0.3175 centimeters (⅛ inch) to approximately 5.08 centimeters (two inches). In particular examples, first rim portion 107a may have a height equal to or approximately 1.143 centimeters (approximately 0.450 inches) and second rim portion 107b may have a height equal to or approximately 0.9144 centimeters (approximately 0.360 inches). In particular examples, first and second rim portions 107a,b may be laterally offset by a distance equal to or approximately 0.508 centimeters (approximately 0.20 inches). Other suitable dimensions and distances less than, between, or greater than the ranges described are also contemplated by the present disclosure.

As discussed previously, each pair of at least two leg posts 104 defines between them a first ventilation opening 112 for airflow through cover assembly 100. The top surface of housing 102 defines one or more second ventilation openings 114 configured to dispense air or steam received from the one or more first ventilation openings 112 out of cover assembly 100. As illustrated throughout the figures, the one or more second ventilation openings 114 may have a curvy or wavy geometry, and may be positioned in groups of three equidistantly around the top surface. In other examples, the one or more second ventilation openings 114 may comprise any other geometry (e.g., circular, triangular, rectangular, slotted), any other grouping (e.g., less than or greater than three openings together), and any other arrangement (e.g., non-equidistant, arranged in pattern other than a circle) suitable for venting air and steam out of cover assembly 100.

Housing 102, the at least two leg posts 104, and rim 106 may be manufactured from a variety of microwave oven-safe materials including polymers, glass, ceramics, stoneware, certain paper products, certain metals without sharp corners, and other similar materials known to one of ordinary skill in the art. In examples, each of housing 102, leg posts 104, and rim 106 may be manufactured from the same material. In other examples, one or more of housing 102, leg posts 104, and rim 106 may be manufactured from a different material compared to the other components. For example, housing 102 may be manufactured from a glass material while leg posts 104 and rim 106 may be manufactured from a polymer such as silicone.

Magnet assembly 120 may include a magnet 122, an overmold 124, an undermold 126, a metallic piece 128 positioned proximal or underneath magnet 122, and a door 129. When integrated into housing 102 (e.g., integrated into a top surface of housing 102 at the closed end as depicted in the figures), magnet assembly 120 may be arranged in the following manner: undermold 126 can be couplable to a small opening defined, for example, at or near a midpoint of the closed end; metallic piece 128 may be positioned within undermold 126 with magnet 122 positioned on or near metallic piece 128 (e.g., magnet 122 and metallic piece 128 may be coincident with each other, with metallic piece 128 being proximal housing 102 and magnet 122 being distal housing 102) (e.g., magnet 122 and metallic piece 128 may be conjoined as a single integral component); overmold 124 may be positioned over undermold 126 such that magnet 122, undermold 126, and metallic piece 128 are all enveloped or covered at the closed end of housing 102; and door 129 may be positioned within undermold 126 to cover magnet 122 and metallic piece 128 at the open end of housing 102. In this arrangement, overmold 124 is visible from the closed end of housing 102 while the remaining components of magnet assembly 120 are not. From the open end of housing 102, as shown for example in FIGS. 1B and 1C, undermold 126 and door 129 are visible with the other components of magnet assembly 120 being not visible given their concealed position. Accordingly, magnet assembly 120 is kept safe during microwaving because of this arrangement.

This arrangement of magnet assembly 120 is internally referred to as a KEEPER magnet configuration. Placing a metallic piece 128 coincident with a bottom surface of magnet 122 creates a "KEEPER" magnet where the metallic piece 128 becomes saturated with magnetic field during microwave oven cooking or heating. This causes a boost in magnetism out of the closed end of housing 102 (i.e., magnetism directed away from the open end of housing 102) which increases the magnetic pull strength outputted by magnet assembly 120. The KEEPER magnet configuration also inhibits any magnetic field from escaping or leaking elsewhere out of a bottom portion of undermold 126 and into the microwave oven (i.e., inhibits magnetism directed toward the open end of housing 102). Accordingly, magnet assembly 120 provides a microwave oven-safe approach to coupling a cover assembly 100 to an internal portion of the oven using an electromagnetically safe magnet 122. Additionally, cover assembly 100 is safe for use during microwave oven operation because of the electromagnetically safe magnet 122.

Magnet assembly 120 has a small footprint or occupied space in the microwave oven because it comprises a single magnet 122 positioned at one location on the closed end of housing 102. This is unlike certain conventional covers or enclosures which may comprise several magnets spread out over a housing which increases the footprint or overall occupied space of such magnet assemblies. The small footprint of magnet assembly 120 advantageously enables cover assembly 100 to be magnetically couplable to a single point on a microwave oven ceiling (or side surface), rather than multiple points, when cover assembly 100 is stored in the microwave oven. Certain microwave ovens have various internal structures protruding from the ceiling or side surfaces. By being couplable to a single point, magnet assembly 120 reduces material conflict (i.e., material impacts) between cover assembly 100 and the internal protrusions. Moreover, the height of magnet assembly 120 relative to the protrusion height inhibits material conflicts or impacts between cover assembly 100 and the protrusions, even if the protrusions are positioned proximate a surface of housing 102.

In examples, metallic piece 128 may comprise a metal washer slug having a circular or cylindrical geometry. In examples, the metallic piece 128 may be covered with one or both of a metal foil (e.g., aluminum foil) and a metallic coating (e.g., a metallic powder) to shield the magnet assembly 120 from microwave energy during microwave oven cooking or heating. This is in addition to magnet 122 also being covered with one or both of a metal foil and a metallic coating for the same purpose. In examples, after magnet 122 and metallic piece 128 have been independently and separately covered, the components can be joined together (e.g., magnetically joined together) and positioned for use with cover assembly 100. In examples, magnet 122 and metallic piece 128 can be magnetically joined together first and then subsequently covered with one or both of a metal foil and a metallic coating (i.e., a single covering of metal foil or metallic coating for the conjoined set of magnet 122 and metallic piece 128 rather than covering the components separately).

In examples, overmold 124 may have a knob-like design with a tapered profile extending from a first end to a second end, the overmold 124 having a plurality of ridges formed on a periphery surface that extend from the first end to the second end. Overmold 124 may be configured to provide a non-slip grip when a user grabs the overmold 124 to move the cover assembly 100 (e.g., overmold 124 being couplable to housing 102 enables movement of cover assembly 100 when a user grabs overmold 124). In examples, overmold 124 may comprise a thermoplastic rubber material such as styrene butadiene styrene. In examples, door 129 may comprise a polymer material. In examples, magnet 122 may comprise material or alloy selected from the group consisting of neodymium, alnico, ceramic, samarium cobalt, strontium, barium, and ferrite. In a related example, magnet 122 can be a strontium flexible magnetic element that is adhered to, clipped in, or molded into the housing 102.

In examples, overmold 124, undermold 126, and door 129 can be made from the same material as housing 102 or made from a different material described herein. For example, one or all of overmold 124, undermold 126, and door 129 may comprise a heat-resistant plastic material or a ceramic material. This provides protection to magnet 122 and metallic piece 128 which are contained inside the collective structure formed by overmold 124, undermold 126, and door 129. In examples, undermold 126 and door 129 may form a single integral undermold structure that simultaneously contains and covers magnet 122 and metallic piece 128 at the open end of the housing (e.g., an undermold structure or undermold design that comprises the functionality and purpose of both undermold 126 and door 129).

In examples, cover assembly 100 may include an attachment assembly in addition to or in place of magnet assembly 120. The attachment assembly can be configured to couple cover assembly 100 to a ceiling or side surface of a microwave oven. For example, the attachment assembly may be couplable to housing 102 or rim 106 and may comprise suction cups, mechanical fasteners (e.g., hook and loop fasteners, straps, snap buttons, etc.), or adhesives that are heat resistant and safe for use in microwave ovens. In examples, cover assembly 100 may include two or more magnet assemblies 120 arranged on housing 102 or rim 106, in addition to one or more non-magnetic attachment assemblies. In examples, the microwave oven may comprise, or be configured to comprise, a corresponding attachment member or mechanism operably couplable to the non-magnetic attachment assembly (e.g., a ceiling or side surface of the microwave oven may comprise hook and loop fasteners, straps, snap buttons, etc. corresponding to those elements of cover assembly 100).

Figure 6:
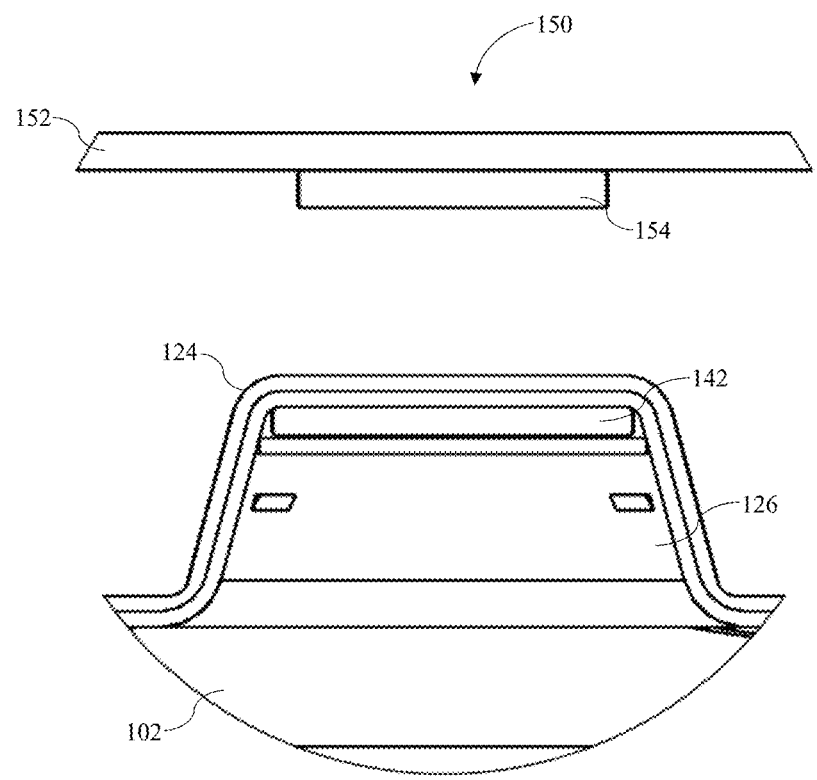
FIG. 6 is a detail view of a microwave oven cover assembly having a metallic member couplable to a magnet of a microwave oven when the cover assembly is received therein, according to examples of the present disclosure.

In examples such as the one illustrated in FIG. 6, cover assembly 100 may further include a metallic member such as a steel slug 142 that is covered or coated with one or both of a metal foil (e.g., aluminum foil) and a metallic coating (e.g., a metallic powder coating, a radiofrequency-reflective coating). Cover assembly 100 may include the covered or coated steel slug 142 in addition to or in place of magnet assembly 120 in such examples. When configured this way, cover assembly 100 may be used in certain stainless steel interior microwave ovens that are incompatible with magnets. This is in addition to cover assembly 100 being compatible with standard microwave ovens such as steel-painted interior microwave ovens.

In other examples where cover assembly 100 includes a metallic member such as a steel slug 142, such as the example illustrated in FIG. 6, the microwave oven 150 to be used may comprise a magnet 154 couplable to a ceiling or side surface 152 and can be configured to magnetically interface with the metallic member or slug 142. The magnet 154 may be securely couplable to the microwave oven 150 using adhesives, hook and loop fasteners, straps, snap buttons, a magnetic coupling, or any other suitable coupling mechanism. In operation, the metallic member or slug 142 of cover assembly 100 may be couplable to the magnet 154 of the microwave oven 150 to secure cover assembly 100 therein. Accordingly, an alternate, inverse approach to securing a cover assembly 100 within a microwave oven 150 is contemplated by the present disclosure (i.e., inverse compared to other examples where cover assembly 100 includes magnet assembly 120 couplable to a metallic member of the microwave oven). In examples, the microwave oven 150 may comprise non-magnetic attachment mechanisms configured to be couplable to the metallic member or slug 142 of cover assembly 100 (e.g., replace the microwave oven magnet 154 with adhesives, fasteners, straps, etc., for non-magnetic coupling).

In examples, cover assembly 100 can be configured for cooking and heating with the open end of housing 102 directed toward the microwave ceiling, rather than the intended configuration of the closed end of housing 102 directed toward the ceiling. Accordingly, rather than merely being used to inhibit splattering, cover assembly 100 can be used as a heat-resistant container of food, liquid, or other items that are cooked or heated in a microwave oven (e.g., cover assembly 100 can be used to cook or heat soup or other liquids placed within housing 102).

Referring now generally to FIGS. 2A through 2H, a cover assembly 200 for use with a microwave oven during cooking or heating, according to a second design of the present disclosure, is depicted. Cover assembly 200 may include a housing 202, first optional engravings (not depicted; e.g., symbols, characters, letters, words, etc.), at least two leg posts 204 positioned below the housing 202, a rim 206 positioned between the housing 202 and the at least two leg posts 204, one or more first ventilation openings 212 positioned between adjacent at least two leg posts 204, and one or more second ventilation openings 214 defined in a top surface of housing 202. Cover assembly 200 may further include a handle assembly 230 having a handle member 232 that defines one or more openings, a recessed portion 234 proximal the handle member 232, and optional engravings (not depicted; e.g., symbols, characters, letters, words, etc.) on the handle member 232.

In examples, cover assembly 200 may include a magnet assembly (not depicted) identical to magnet assembly 120. This magnet assembly may be couplable to housing 202 in a comparable manner as magnet assembly 120 is couplable to housing 102. Alternatively, this magnet assembly may be couplable to a portion of handle assembly 230 such as handle member 232. In examples, cover assembly 200 may further include a metallic member such as a steel slug that is covered or coated with one or both of a metal foil and a metallic coating. Cover assembly 200 may include the covered or coated steel slug in addition to or in place of a magnet assembly, to make cover assembly 200, like cover assembly 100, compatible with non-magnetic stainless steel interior microwave ovens and standard microwave ovens such as steel-painted interior microwave ovens (i.e., cover assemblies 100 and 200 can be compatible with magnetic and non-magnetic microwave ovens in certain examples of the present disclosure). Refer to the comparable example illustrated in FIG. 6 which can be used in a similar manner with cover assembly 200. In examples, cover assembly 100 may include a handle assembly 230 in a similar configuration as used with cover assembly 200, in addition to including magnet assembly 120.

In other examples where cover assembly 200 includes a metallic member such as a steel slug, the microwave oven to be used may comprise a magnet couplable to a ceiling or side surface and configured to magnetically interface with the metallic member. The magnet may be secured to the microwave oven using adhesives, hook and loop fasteners, straps, snap buttons, a magnetic coupling, or other suitable coupling mechanisms. In operation, the metallic member of cover assembly 200 may be couplable to the magnet of the microwave oven to secure cover assembly 200 therein. Accordingly, an alternate, inverse approach to securing a cover assembly 200 within a microwave oven is contemplated by the present disclosure (i.e., inverse compared to other examples where cover assembly 200 includes a magnet assembly (not depicted) couplable to a metallic member of the microwave oven). In examples, the microwave oven may comprise non-magnetic attachment mechanisms configured to be couplable to the metallic member of cover assembly 200 (e.g., replace the microwave oven magnet with adhesives, fasteners, straps, etc., for non-magnetic coupling). Refer to the comparable example illustrated in FIG. 6 which can be used in a similar manner with cover assembly 200.

Cover assembly 200 has many similarities to cover assembly 100 and for simplicity, the description of common components is not repeated in the following. Like reference numerals and features names may designate like feature names throughout that are corresponding or analogous. It should be understood that cover assembly 200 can be configured to have the same or similar advantages and features as cover assembly 100, in addition to the new advantages and features which will are described below. One such advantage or feature is that cover assembly 200 can be configured to be collapsible from an original, operational configuration used during microwave oven cooking or heating. Specifically, housing 202 can be compressed downward toward rim 206 to reduce the overall height and size of cover assembly 200. This is particularly useful when cover assembly 200 is stored inside a microwave oven or inside a cabinet, for example, because the volume of space that cover assembly 200 occupies is reduced when in a compressed configuration. Cover assembly 200 can be uncompressed (i.e., housing 202 extended to its original, operational height) when used to inhibit splattering during microwave oven cooking or heating.

Housing 202 may be dome-shaped in that it defines a tapered profile between a top, closed portion and a bottom, open portion (i.e., housing 202 may have a frustoconical geometry). Housing 202 may include one or more ridges 216 on a periphery surface as illustrated in the figures. The one or more ridges 216 may also compress downward to reduce the height and size of cover assembly 200. In examples, the one or more ridges 216 included with housing 202 may be integrally couplable to rim 206 to form a single unitary structure (e.g., manufactured as a single structure, for example). In examples, cover assembly 100 may include one or more ridges 216 in a similar configuration as used with cover assembly 200.

Handle assembly 230 may be received within an opening defined in the closed end of housing 202. The opening may form all or part of recessed portion 234 which can be configured to receive one or more fingers of a user for gripping or grasping of handle assembly 230. Handle member 232 may have a cylindrical geometry with a diameter approximately equal to the diameter of recessed portion 234, but sufficiently reduced so that handle member 232 fits securely within the recessed portion 234. Handle member 232 may have a height equal to, or substantially equal to, the height of recessed portion 234, so that a top surface of handle member 232 is coincident with a corresponding top surface of housing 202 (e.g., top surface being the outermost surface at the closed end of housing 202).

Handle member 232 may define one or more openings that extend into recessed portion 234. The one or more openings may be oval shaped or may comprise any geometry sufficiently large enough to receive at least a portion of a human hand or finger. In operation, a user may grip or grasp handle member 232 by curling at least one finger into the opening and the coupled recessed portion 234. For example, a user may curl their index, middle, ring, and little fingers into the opening and recessed portion, tightly grip a bottom surface of the handle member 232 proximal the recessed portion 234, and apply force against the bottom surface. By doing this, the user can move cover assembly 200, using handle assembly 230, onto or off food, liquid, or other items in a microwave oven during cooking or heating. Handle assembly 230 advantageously provides a non-magnetic, microwave oven-safe approach to handling cover assembly 200. Because cover assembly 200 is generally made from lightweight materials (e.g., polymers), the user requires little force to move cover assembly 200 into or around a microwave oven using handle assembly 230.

Figure 3:
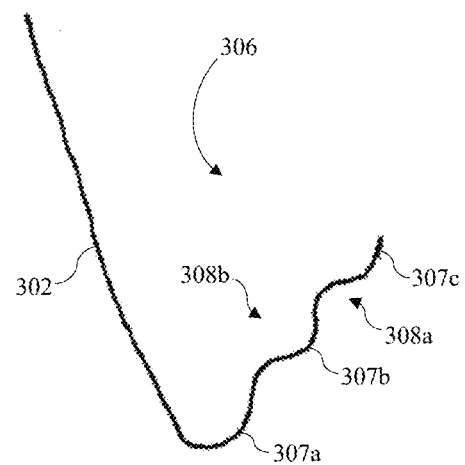
FIG. 3 is a cross-section detail view of a microwave oven cover assembly rim having a wave, ripple, or curved configuration, according to examples of the present disclosure.

Referring now to FIG. 3, rim 306 may include first, second, and third rim portions 307a,b,c couplable to each other at shared, optionally rounded corners. For example, first and second rim portions 307a,b may be couplable at a first shared, optionally rounded corner, and second and third rim portions 307b,c may be couplable at a second shared, optionally rounded corner. In this configuration, rim 306 generally defines a cross-section geometry having a wave, ripple, or curved profile as illustrated in FIG. 3. Like the corners of rims 106 and 206, the corner profile of rim 306 advantageously inhibits or reduces mechanical deformation caused by continued use of rim 306 with a corresponding cover assembly (e.g., rim 306 can be used with cover assemblies 100, 200 in place of rims 106, 206, respectively).

Housing 302 may be couplable to rim 306 via first rim portion 307a (similar to previously described housings and rims). Rim 306 may include an outer wall 308a opposite an inner wall 308b to form the generally thin-walled structure that rim 306 comprises. In other examples, rim 306 can include additional rim portions beyond first, second, and third rim portions 307a,b,c (e.g., fourth, fifth, sixth, etc., rim portions). The cross-section geometry or profile of rim 306 with additional rim portions may continue to comprise a wave, ripple, or curved design for added resistance to mechanical deformation. In examples, the corner connections between first, second, and third rim portions 307a,b,c may form an approximate 90-degree angle similar to the corners of rims 106, 206 in examples. In operation, a user can press their thumb or other finger against first, second, or third rim portions 307a-c to move a corresponding cover assembly as needed.

Figure 4:
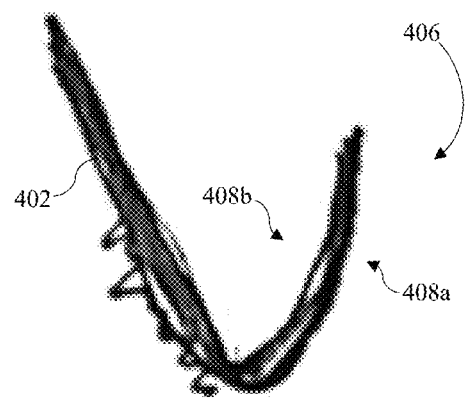
FIG. 4 is a cross-section detail view of a microwave oven cover assembly rim having a substantially convex, inward arcing configuration, according to examples of the present disclosure.

Referring now to FIG. 4, rim 406 may comprise a substantially convex, inward arcing configuration as illustrated. Rim 406 can be couplable to a housing 402 in a similar manner as discussed previously for other rim designs and configurations with corresponding housings (e.g., rim 106 with housing 102). Rim 406 may include an outer wall 408a opposite an inner wall 408b to form the generally thin-walled structure that rim 406 comprises. Inner wall 408b may arc inward to form the substantially convex configuration illustrated in FIG. 4. Like previous rim designs and configurations, the design of rim 406 advantageously inhibits or reduces mechanical deformation caused by continued use of rim 406 with a corresponding cover assembly (e.g., rim 406 can be used with cover assemblies 100, 200 in place of rims 106, 206, respectively). In operation, a user can press their thumb or other finger against the convex inner wall 408b to move a corresponding cover assembly as needed.

Figure 5:
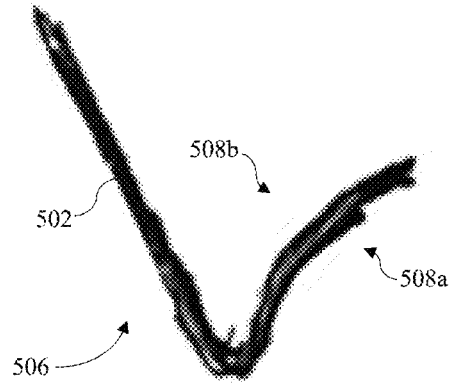
FIG. 5 is a cross-section detail view of a microwave oven cover assembly rim having a substantially concave, outward arcing configuration, according to examples of the present disclosure.

Referring now to FIG. 5, rim 506 may comprise a substantially concave, outward arcing configuration as illustrated. Rim 506 can be couplable to a housing 502 in a similar manner as discussed previously for other rim designs and configurations with corresponding housings (e.g., rim 106 with housing 102). Rim 506 may include an outer wall 508a opposite an inner wall 508b to form the generally thin-walled structure that rim 506 comprises. Inner wall 508b may arc outward to form the substantially concave configuration illustrated in FIG. 5. Like previous rim designs and configurations, the design of rim 506 advantageously inhibits or reduces mechanical deformation caused by continued use of rim 506 with a corresponding cover assembly (e.g., rim 506 can be used with cover assemblies 100, 200 in place of rims 106, 206, respectively). In operation, a user can press their thumb or other finger against the concave inner wall 508b to move a corresponding cover assembly as needed.

Additional features, components, arrangements, or configurations of cover assemblies 100, 200 may be found in U.S. Pat. No. 10,582,802 to the present assignee, Caswell Products LLC, the disclosure of which is incorporated by reference herein in its entirety.

Various examples of systems, devices, and methods have been described herein. These examples are given only by way of example and are not intended to limit the scope of the claimed inventions. It should be appreciated, moreover, that the various features of the examples that have been described may be combined in various ways to produce numerous additional examples. Moreover, while various materials, dimensions, shapes, configurations and locations, etc. have been described for use with disclosed examples, others besides those disclosed may be utilized without exceeding the scope of this disclosure.

Persons of ordinary skill in the relevant arts will recognize that the subject matter hereof may comprise fewer features than illustrated in any individual example described above. The examples described herein are not meant to be an exhaustive presentation of the ways in which the various features of the subject matter hereof may be combined. Accordingly, the examples are not mutually exclusive combinations of features; rather, the various examples can comprise a combination of different individual features selected from different individual examples, as understood by persons of ordinary skill in the art. Moreover, elements described with respect to one example can be implemented in other examples even when not described in such examples unless otherwise noted.

Although a dependent claim may refer in the claims to a specific combination with one or more other claims, other examples can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A cover assembly for use in a microwave oven, comprising:
   a housing configured for covering a food item during microwave oven cooking, the housing having a closed end and an open end; and
   a rim coupled to the housing at the open end, the rim having a first rim portion coupled to a second rim portion at a corner to provide structural strength to the rim, wherein the rim is configured to be gripped by a user to move the cover assembly on to or off a food item during microwave oven cooking, wherein the first rim portion is proximate the open end of the housing and the second rim portion is distal the open end of the housing, wherein the second rim portion extends outward from the first rim portion away from the housing, and wherein the first rim portion and the second rim portion extend around the entire periphery of the housing.

2. The cover assembly of claim 1, wherein the rim further comprises a third rim portion coupled to the second rim portion at a corner, the first, second, and third rim portions collectively forming a ripple design when the rim is viewed at a cross-section.

3. The cover assembly of claim 1, further comprising a metallic member coupled to the housing, the metallic member configured to magnetically interface with a microwave oven magnet to adhere the cover assembly to the microwave oven.

4. The cover assembly of claim 1, further comprising at least two leg posts, the at least two leg posts configured to support the housing on a flat surface and configured to facilitate air flow through the housing.

5. The cover assembly of claim 1, further comprising a handle assembly coupled to the closed end, the handle assembly having a handle member configured for gripping by a user, thereby enabling movement of the cover assembly.

6. The cover assembly of claim 5, wherein the handle member defines at least one cavity that a user can grasp to enable movement of the cover assembly.

7. The cover assembly of claim 1, wherein the first rim portion and the second rim portion collectively comprise a substantially convex, inward arcing configuration.

8. The cover assembly of claim 1, wherein the first rim portion and the second rim portion collectively comprise a substantially concave, outward arcing configuration.

9. The cover assembly of claim 1, wherein the first rim portion is coupled to the second rim portion at a rounded corner defining an approximate 90-degree angle between the first and second rim portions.

10. A cover assembly for use in a microwave oven, comprising:
- a housing configured for covering a food item during microwave oven cooking, the housing having a closed end and an open end, wherein the closed end of the housing has at least one opening adapted to enable airflow through the closed end;
- a rim coupled to the housing at the open end, the rim having a first rim portion coupled to a second rim portion at a corner to provide structural strength to the rim, wherein the rim is configured to be gripped by a user to move the cover assembly onto or off a food item during microwave oven cooking, wherein the second rim portion extends outward from the first rim portion away from the housing, and wherein the first rim portion and the second rim portion extend around the entire periphery of the housing; and
- at least two leg posts extending from the first rim portion, the at least two leg posts configured to support the housing on a flat surface and configured to facilitate air flow through the housing.

11. The cover assembly of claim 10, wherein the first rim portion and the second rim portion collectively comprise a substantially convex, inward arcing configuration.

12. The cover assembly of claim 10, wherein the first rim portion and the second rim portion collectively comprise a substantially concave, outward arcing configuration.

13. The cover assembly of claim 10, wherein the rim further comprises a third rim portion coupled to the second rim portion at a corner, the first, second, and third rim portions collectively forming a ripple design when the rim is viewed at a cross-section.

14. The cover assembly of claim 10, wherein the first rim portion is coupled to the second rim portion at a rounded corner defining an approximate 90-degree angle between the first and second rim portions.

15. The cover assembly of claim 10, further comprising a metallic member coupled to the housing, the metallic member configured to magnetically interface with a microwave oven magnet to adhere the cover assembly to the microwave oven.

* * * * *